UNITED STATES PATENT OFFICE.

RALPH E. SAYRE, OF PITTSBURGH, PENNSYLVANIA, ASSIGNOR TO METALS RECOVERY COMPANY, OF NEW YORK, N. Y., A CORPORATION OF MAINE.

FLOTATION OF MINERALS.

1,378,562.  Specification of Letters Patent.  Patented May 17, 1921.

No Drawing.  Application filed January 25, 1921. Serial No. 439,832.

*To all whom it may concern:*

Be it known that I, RALPH E. SAYRE, residing at Pittsburgh, in the county of Allegheny, State of Pennsylvania, have invented certain new and useful Improvements in the Flotation of Minerals; and I do hereby declare the following to be a full, clear, and exact description of the invention, such as will enable others skilled in the art to which it appertains to make and use the same.

This invention relates to the concentration of minerals, such as sulfid ores and the like, by flotation.

The invention is based upon the discovery that the flotation operation can, in many cases, be improved by the addition to the ore or mineral pulp of an aldehyde condensation product, such as slightly acidulated aldol, etc. Such aldehdye condensation products appear to have little if any selective action in bringing about the flotation of the mineral, but they have marked frothing qualities and provide an appropriate amount of froth with an ore pulp containing a suitable selective or collecting agent but lacking in frothing qualities, or an ore pulp which requires no added selective agent but is lacking in frothing qualities. The aldehyde condensation product may thus be used to advantage with flotation agents which have marked selective or collecting properties but which are devoid of, or deficient in, frothing qualities.

The aldehyde condensation products can be produced, for example, by subjecting acetaldehyde to condensation with alkali and neutralizing the alkali with acid, preferably in slight excess, thereby producing, as products of condensation, *e. g.*, aldol, $CH_3.CHOH.CH_2.CHO.$, and acid condensation products of aldol. Upon heating, aldol loses a molecule of water, giving crotonaldehyde, $CH_3.CH:CH.CHO.$ If aldol is distilled *in vacuo* at low temperatures it polymerizes, giving paraldol, which is a crystalline solid. If the condensation of acetaldehyde with alkali is prolonged, the aldol first formed undergoes further condensation, yielding aldehyde resins, which are amorphous solids of unknown constitution. By treatment with a small amount of a mineral acid, aldol can be made to undergo a change to a greater or less extent, probably a condensation, with the resulting production of aldehyde condensation products, or aldol condensation products, which have been found to possess far greater frothing qualities than pure aldol. The various condensation products above referred to can be used in carrying out the process of the present invention. The aldehyde condensation product need not be obtained and isolated in a pure state, but the composite condensation product, or mixture of products, can be used directly, in a crude or impure state.

When aldol is produced from acetaldehyde by condensation with alkali, if a slight excess of acid, such as sulfuric acid or sodium acid sulfate, is used for the neutralization, so that the aldol produced is slightly acid with sulfuric acid or sodium acid sulfate, such acid will bring about a change in the aldol, with the formation of aldol condensation products, even when a mere trace of acid is present. This change can be effected by the prolonged action of small amounts, for example, of inorganic acids, such as sulfuric, phosphoric, or hydrochloric acid, as well as by organic acids and other reagents, and can be made quite rapid, *e. g.*, by the use of an amount of inorganic acid no greater than one per cent. A slight excess of the acid used for neutralizing the alkali condensing agent may suffice to bring about this change and the production of products, probably products of condensation of a more or less complex character, which I will refer to as aldol condensation products. I have found that aldol, which has been subjected to the action of acids, even in exceedingly small amounts, possesses far greater frothing properties than pure aldo' itself. When aldol is produced without any excess of acid, its frothing qualities can be very considerably improved by the addition of a small amount of mineral acid.

The aldehyde condensation product can be incorporated with the ore or mineral pulp in any suitable manner which will insure its uniform incorporation and dissemination throughout the pulp. It may thus be incorporated by adding to the grinding mill, in which the ore is ground, or it can be added after the grinding operation and during or prior to the flotation operation.

The flotation operation can be carried out in any suitable apparatus, such as an ordinary Callow cell, or in apparatus where the air is incorporated in the ore pulp by mechanical agitation.

It is of advantage in many cases, as with certain copper ores, to add to the ore pulp a small amount of alkali, which may be sufficient in amount to give to the ore pulp a distinct alkaline reaction. When alkalis are used, it is desirable to give them an appreciable time of contact with the ore pulp before subjecting the latter to flotation. The alkalis can thus be added with advantage in the grinding mill so that they will be present during the grinding operation. The alkali may be caustic alkali, such as sodium hydrate, or an alkaline salt, such as sodium carbonate, or even lime or calcium oxid or hydrate can be used.

The amount of the aldehyde condensation product (e. g. acid treated aldol) added can vary somewhat, and may be as little as 0.2 to 0.5 lb. per ton of ore (that is, calculated on the weight of the ore and not of the ore pulp). Larger amounts may, however, be used, as well as even smaller amounts in some cases.

The invention will be further illustrated by the following specific examples of tests made upon a copper sulfid ore:

Example 1: 500 parts by weight of Utah Copper Company's ore was ground in a pebble mill with 250 parts of water, lime equivalent to four pounds per ton of dry ore, and thiocarbanilid equivalent to one-fifth pound per ton. The ground pulp was transferred to a Callow rougher cell, diluted and floated after the addition of acid treated aldol equivalent to one-fifth pound per ton of dry ore. A satisfactory froth was produced at once. Aeration of the pulp was continued until the concentration of the sulfid mineral practically ceased. A satisfactory concentrate and high recovery were obtained.

Example 2: The treatment was similar to that of Example 1, except that diazoaminobenzene equivalent to one-fifth pound per ton of dry ore was used in place of the thiocarbanilid.

With an ore of the character referred to in the above examples, it is of importance to provide a selective or collecting agent to supplement the action of the acid treated aldol, which appears to be essentially that of a frothing agent with but little selective or collecting properties. Where, however, the ore pulp contains an appropriate selective or collecting agent, or inherently requires the addition of no such agent, but is deficient in frothing qualities, the addition of acid treated aldol, in a manner similar to that above described, imparts the desirable frothing qualities, and provides bubbles in sufficient quantity and of sufficient persistency to overflow into the launder of the flotation machine, thereby mechanically facilitating the removal of the mineral concentrate.

It will be evident that, where selective or collecting agents are required, different agents may be used having the desired selective or collecting or mineral-modifying properties. Certain of these agents, such as thiocarbanilid and diazoaminobenzene, have very marked selective or collecting or mineral-modifying qualities, but are substantially devoid of frothing qualities. The use of an aldehyde condensation product, according to the present invention, is therefore of particular value in connection with the use of flotation agents of this character. The present invention can, however, be carried out with the use of other flotation agents, which may have both selective or collecting and frothing qualities, but which are deficient in frothing qualities, and the requisite frothing properties can be imparted by the addition of the aldehyde condensation product, in a manner similar to that above described.

I claim:

1. The method of effecting the concentration of minerals by flotation, which comprises adding to the mineral pulp a small amount of an aldehyde condensation product, and subjecting the resulting mixture to a flotation operation; substantially as described.

2. The method of effecting the concentration of minerals by flotation, which comprises adding to the mineral pulp a small amount of a selective or collecting or mineral-modifying agent, deficient in frothing qualities, together with a small amount of an aldehyde condensation product, and subjecting the resulting mixture to a flotation operation; substantially as described.

3. The method of effecting the concentration of copper sulfid ores by flotation, which comprises adding to the mineral pulp a small amount of an alkali and a small amount of an aldehyde condensation product, and subjecting the resulting mixture to a flotation operation; substantially as described.

4. The method of effecting the concentration of copper sulfid ores by flotation, which comprises adding to the mineral pulp a small amount of an alkali, a small amount of a flotation agent deficient in frothing properties, and a small amount of an aldehyde condensation product, and subjecting the resulting mixture to a flotation operation; substantially as described.

5. The method of effecting the concentration of minerals by flotation, which comprises adding to the mineral pulp a small amount of product or products resulting from the condensation of aldol, and subjecting the resulting mixture to a flotation operation; substantially as described.

6. The method of effecting the concentration of minerals by flotation, which comprises adding to the mineral pulp a small amount of a selective or collecting or mineral-modifying agent, deficient in frothing qualities, together with a small amount of an aldol condensation product or products, and subjecting the resulting mixture to a flotation operation; substantially as described.

7. The method of effecting the concentration of copper sulfid ores by flotation, which comprises adding to the mineral pulp a small amount of an alkali and a small amount of an aldol condensation product, and subjecting the resulting mixture to a flotation operation; substantially as described.

8. The method of effecting the concentration of copper sulfid ores by flotation, which comprises adding to the mineral pulp a small amount of an alkali, a small amount of a flotation agent deficient in frothing properties, and a small amount of an aldol condensation product, and subjecting the resulting mixture to a flotation operation; substantially as described.

9. The method of effecting the concentration of minerals by flotation, which comprises adding to the mineral pulp a small amount of a product resulting from the action of an acid on aldol, and subjecting the resulting mixture to a flotation operation; substantially as described.

10. The method of effecting the concentration of minerals by flotation, which comprises adding to a mineral pulp a small amount of a selective or collecting or mineral-modifying agent deficient in frothing qualities, together with a small amount of a product resulting from the action of acid on aldol, and subjecting the resulting mixture to a flotation operation; substantially as described.

In testimony whereof I affix my signature.

RALPH E. SAYRE.